United States Patent
Brennan et al.

(10) Patent No.: US 7,551,177 B2
(45) Date of Patent: Jun. 23, 2009

(54) METHODS AND APPARATUS FOR RETRIEVING AND COMBINING SAMPLES OF GRAPHICS INFORMATION

(75) Inventors: Chris Brennan, West Newton, MA (US); John Isidoro, Framingham, MA (US); Anthony DeLaurier, Winter Springs, FL (US)

(73) Assignee: ATI Technologies, Inc., Markham, Ontario (CA)

( * ) Notice: Subject to any disclaimer, the term of this patent is extended or adjusted under 35 U.S.C. 154(b) by 259 days.

(21) Appl. No.: 11/216,690

(22) Filed: Aug. 31, 2005

(65) Prior Publication Data

US 2007/0046682 A1    Mar. 1, 2007

(51) Int. Cl.
*G06T 15/30* (2006.01)
*G06F 15/80* (2006.01)
*G09G 5/37* (2006.01)
*G09G 5/00* (2006.01)
*G06K 9/00* (2006.01)
*G06K 9/40* (2006.01)
*G06K 9/60* (2006.01)

(52) U.S. Cl. .................. 345/582; 345/423; 345/606; 345/505; 345/561; 382/253; 382/260; 382/300; 382/305

(58) Field of Classification Search .............. 345/418, 345/423, 581–582, 606, 609–614, 630, 505, 345/552, 561, 574; 382/253, 254, 260, 282, 382/284, 300, 305
See application file for complete search history.

(56) References Cited

U.S. PATENT DOCUMENTS

| 5,216,498 | A | * | 6/1993 | Matsunawa et al. | 358/500 |
| 5,822,452 | A | * | 10/1998 | Tarolli et al. | 382/166 |
| 6,236,433 | B1 | * | 5/2001 | Acharya et al. | 348/273 |
| 6,476,807 | B1 | | 11/2002 | Duluk, Jr. et al. | |
| 7,116,819 | B2 | * | 10/2006 | Zhang | 382/162 |
| 7,187,393 | B1 | * | 3/2007 | Tokimoto et al. | 345/698 |
| 7,230,619 | B2 | * | 6/2007 | Leprevost | 345/426 |
| 2006/0158457 | A1 | * | 7/2006 | Herrick et al. | 345/589 |

FOREIGN PATENT DOCUMENTS

| GB | 2400778 A | 10/2004 |
| WO | WO 00/11605 | 3/2000 |

OTHER PUBLICATIONS

International Search Report from European Patent Office mailed Dec. 5, 2006, for International Application No. PCT/IB2006/002466, pp. 1-10.

* cited by examiner

*Primary Examiner*—Wesner Sajous
(74) *Attorney, Agent, or Firm*—Vedder Price, P.C.

(57) ABSTRACT

Disclosed are methods and apparatus for accomplishing the fetching or sampling of channels of pixels or texels such as neighboring pixels or texels or non-neighboring pixels or texels in a simultaneous operation in order to achieve optimization of the performance of a texture pipeline. In particular, logic is disclosed including selector logic configured to retrieve data including a plurality of channels from each of a plurality of pixels or texels and operable to select one channel from the plurality of channels of the data from each of the pixels or texels. The logic also includes combination logic configured to combine two or more of the selected channels into a single vector, such as an RGBA vector representing the color.

24 Claims, 4 Drawing Sheets

METHODS AND APPARATUS FOR RETRIEVING AND COMBINING SAMPLES OF GRAPHICS INFORMATION

TECHNICAL FIELD

The present disclosure relates to methods and apparatus for retrieving and combining graphics information and, more particularly, retrieving sampled channel data and combining the sample channel data into a single vector.

BACKGROUND

In image processing circuits, such as a graphics processing unit, logic and algorithms are typically included to perform texturing of image data to be displayed. More specifically, image filtering, which is performed in the texturing process such as in a texture pipeline, is performed following many different techniques. As examples, known filtering techniques include percentage closer filtering or any similar high order filtering that composes multiple samples of image data together. For example, in bilinear filtering, conventional texture fetching pipelines sample up to four neighboring points for filtering. These samples are then blended together by using weights calculated from the sub-texel position of the sample point within a particular texel box, which is one of the four samples. Further, each of the samples comprises a vector having up to four channels designated typically as R, G, B, and A where R stands for red, G stands for green, B stands for blue, and A denotes alpha, which is typically a transparency value. The result of the filtering is a single vector having up to four channels where the single vector is a blend of the original four vectors (i.e., samples).

There are instances where values of the four samples may be desirable to be used without bilinear filtering in order that custom operations may be performed within a shader in the texture pipeline. Example instances include Percentage Closer Filtering, which compares one channel of the sample with a provided distance and replaces it with a 0.0 or 1.0 value before performing the filtering, and higher order filters, which may require multiple fetches and changing of the blend weights before filtering. Conventional algorithms and accompanying logic typically obtain such values by performing four separate fetches for each of the samples being filtered. Four fetches comes from the fact that there are four components in a vector. There are four neighbors in a two dimensional surface. Filter algorithms usually use four samples, but many use a larger neighborhood, and in those cases several fetch four operations can be used to create the filter at four times the fetch speed compared to doing them individually. In any event, by performing four fetches per vector, the time needed to retrieve that sample data increased.

DETAILED DESCRIPTION OF THE PRESENT EXAMPLES

The present disclosure discusses methods and apparatus for accomplishing the fetching or sampling of channels of pixels, such as but not limited to neighboring pixels or texels, in a simultaneous operation in order to achieve optimization of the performance of a pixel or texture pipeline. In particular, logic is disclosed including selector logic configured to retrieve data including a plurality of channels from each of a plurality of pixels, such as adjacent pixels or texels, non-neighboring pixels or texels or any suitable pixels or texels and is operable to select one channel from the plurality of channels of the data from each of the pixels or texels. The logic also includes combination logic configured to combine two or more of the selected channels into a single vector, such as an RGBA vector representing the color.

The present disclosure also discloses a method for combining pixel or texel information including simultaneously sampling channel data from two or more pixels. The method further includes selecting a channel for each of the sample channel data from the two or more pixels or texels and then combining the plurality of selected channels into a single vector. By simultaneously sampling the data or fetching the data, the timing of filtering is optimized over the conventional methods and apparatus requiring four separate fetches.

Figure 1:
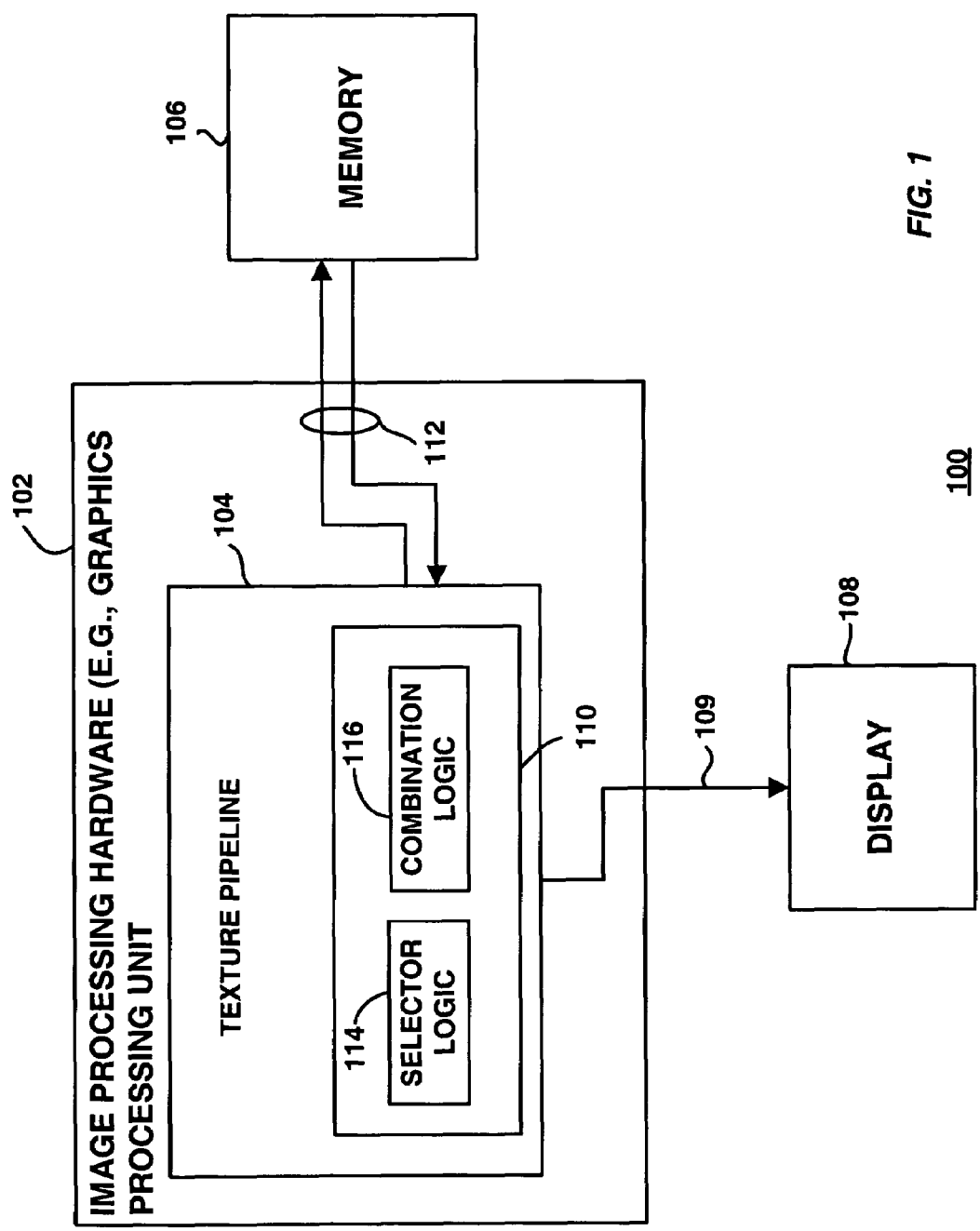
FIG. 1 illustrates a block diagram of an image processing system in accordance with the present disclosure.

FIG. 1 illustrates an image processing system 100 including image processing hardware 102. The image processing hardware may comprise any number of devices including a graphics processing unit, another processing device utilized in a computer system, or a handheld device, such as a PDA or a mobile telephone as examples or in any other suitable device. Within the processing hardware 102 is pixel processing pipeline and in this particular example is shown to be a texture pipeline 104 that performs texturing of image data retrieved from a memory 106, as an example, for display on a display 108. Although described for illustration purposes only with respect to texel processing, the disclosed methods and apparatus may be employed using pixel information as well. It is noted that this display 108 may include any number of known devices for displaying image data including CRT's, LCD screens, other types of visual displays and printer devices. The texture pipeline 104 then delivers the processed image to the display device 108 via an output 109. Within the texture pipeline 104, the presently disclosed apparatus includes logic 110, such as in a texture fetching unit for example, that retrieves texel data from the memory 106 via a memory interface 112. Logic 110 includes selector logic 114 that is configured to receive the texel data (or pixel data), which includes a plurality of channels from each one of a plurality of texels, in this example adjacent texels stored in memory 106. The selector logic 114 is operable to select a single channel from the plurality of channels, which, in the exemplary embodiment, include RGBA channels. Logic 110 also includes combination logic 116 that is configured to combine two or more of the selected channels into a single vector, which is typically an RGBA vector. This vector may represent a color, for example.

Figure 2:
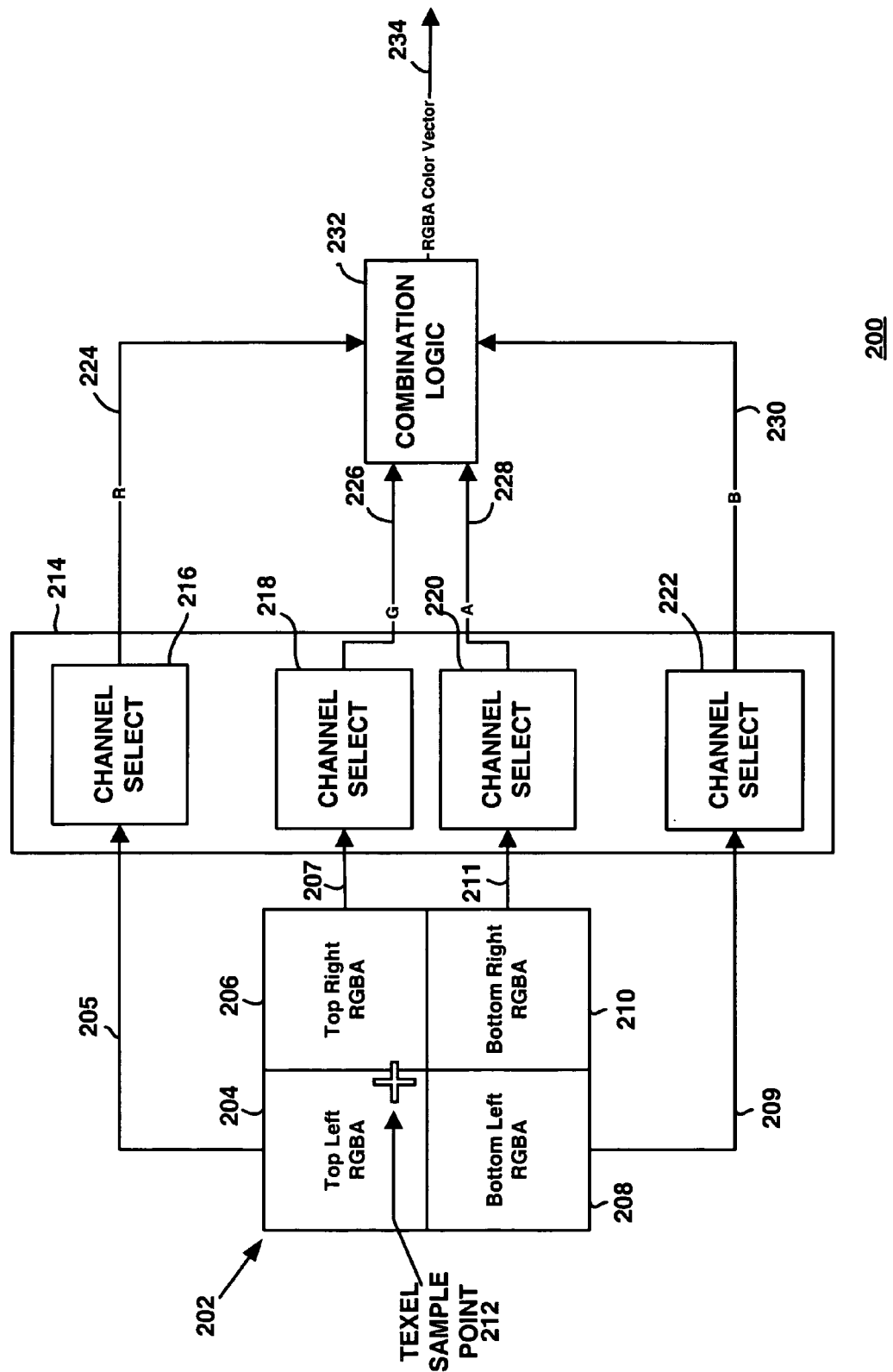
FIG. 2 illustrates a logic diagram illustrating sampling of a texel in accordance with the present disclosure.

FIG. 2 illustrates a more detailed logic diagram of logic 110 of FIG. 1. As shown in the logic diagram 200, an array of texels 202 to be sampled includes at least two or more texels. As illustrated in FIG. 2 the array 202 includes four adjacent texels 204, 206, 208, and 210. Within the array 202 a texel sample point 212, which is the texel to be sampled, is shown.

For purposes of this example, the texel sample point 212 is arbitrarily shown to fall within the top left texel 204, but could be anywhere within the four adjacent texels. Also any suitable plurality of texels or pixels whether adjacent, non-adjacent, neighboring or non-neighboring may be used.

It is noted that each of the texels 204, 206, 208, and 210 include the four RGBA channels. A selector logic 214, corresponding to selector logic 114 in FIG. 1 samples a single channel from each of texels 204, 206, 208 and 210 as illustrated by connections 205, 207, 209, and 211. The selector logic which includes, for illustrative purposes, channel selects 216, 218, 220, or 222 configured to select a particular channel from each of the respective texels 204, 206, 208 and 210 to which they are coupled. For example, the selection logic 214 will choose to sample the R channels of each of texels 204, 206, 208 and 210 being delivered over lines 205, 207, 209, and 211.

The selected channel, which is red in this example, is then output by the selector logic 214 as components of an RGBA vector as illustrated by lines 224, 226, 228 and 230. In other words, although the selection logic selects only red channels from each of the texels 204, 206, 208 and 210, the output of the selector logic represents the red channel of top left pixel 204 as a red (R) channel 224, the red channel of top right texel 206 as a green (G) channel 226, the red channel of bottom left texel 208 as blue (B) channel 230, and the red channel of texel 210 as the alpha (A) channel 228. This information is then delivered to combination logic 232, which corresponds to combination logic 116 in FIG. 1, in order to assemble the channels as a single RGBA color vector 234. This methodology saves time over conventional algorithms in that each sampling period yields a complete RGBA vector, whereas previously each of the RGBA channels from each texel were sampled and subsequently blended prior to delivering a blended color RGBA vector.

Figure 3:
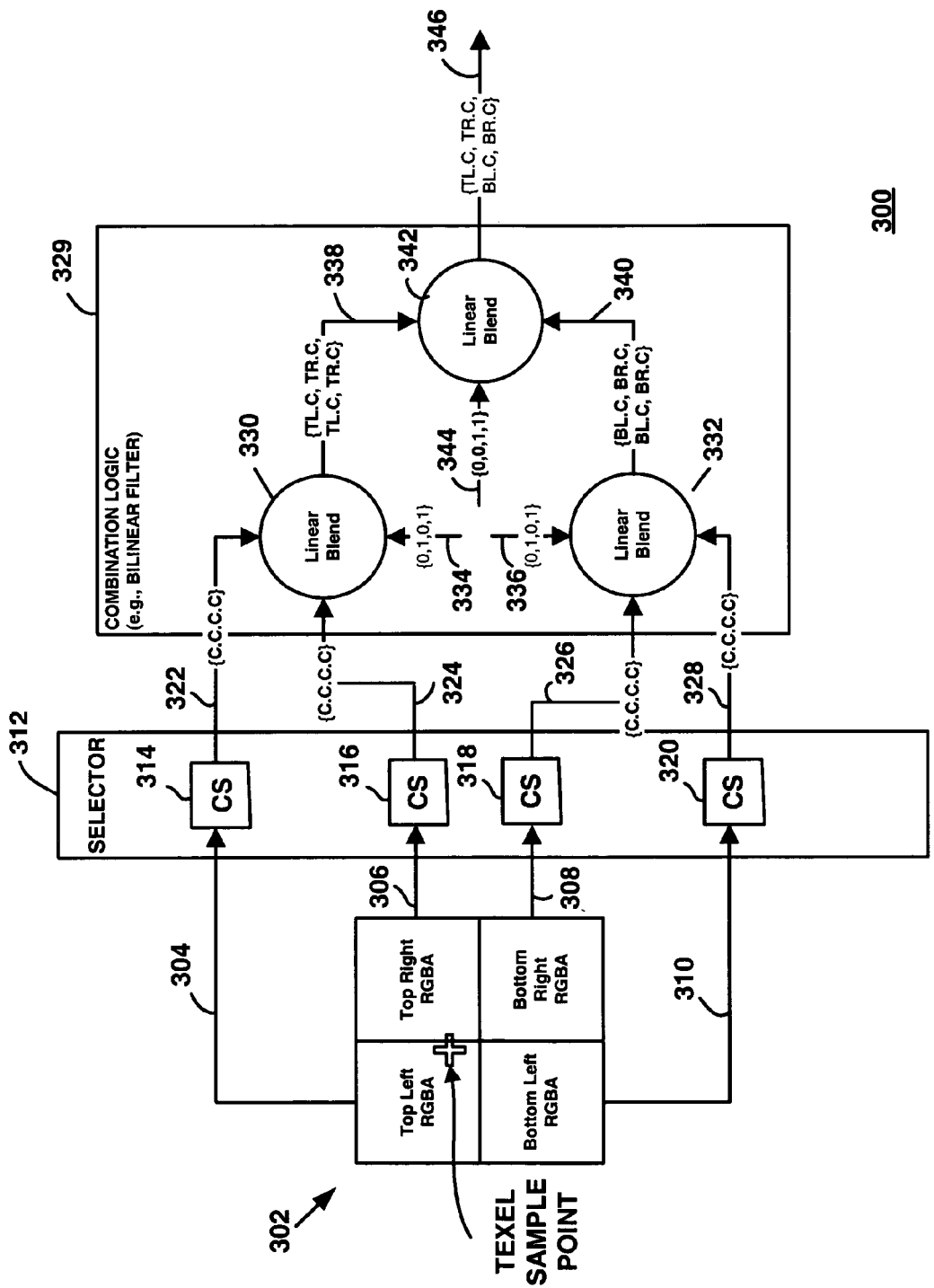
FIG. 3 illustrates another example of a logic diagram illustrating sampling in conjunction with a combination logic.

FIG. 3 illustrates another example of a logic diagram 300 where the combination logic may be configured as a filter such as a bilinear filter or any other suitable filter. It is noted that within the typical texture pipeline, a bilinear filter is already included, thus the example of FIG. 3 utilizes typical existing logic in order to achieve the combination functionality without the addition of a distinct and additional separate combination logic. As illustrated, the texel array 302 of the adjacent texels is sampled by selector logic 312 in the same way as described with respect to FIG. 2. When the channels are delivered to the combination logic 329, which is a bilinear filter, the RGBA values, respectively 322, 324, 328 and 326 are delivered to linear blend logic 330 and 332. Input to these logic 330 and 332 are horizontal weights 334 and 336, which yield an output blend 338 or 340, respectively comprised of the top left channel and top right channel values and bottom left channel and bottom right channel values. Next the vertical blending is accomplished by linear blend 342 including the input of the vertical weight 344 to yield the single color vector 346 including the top left channel, top right channel, bottom left channel and bottom right channel.

Figure 4:
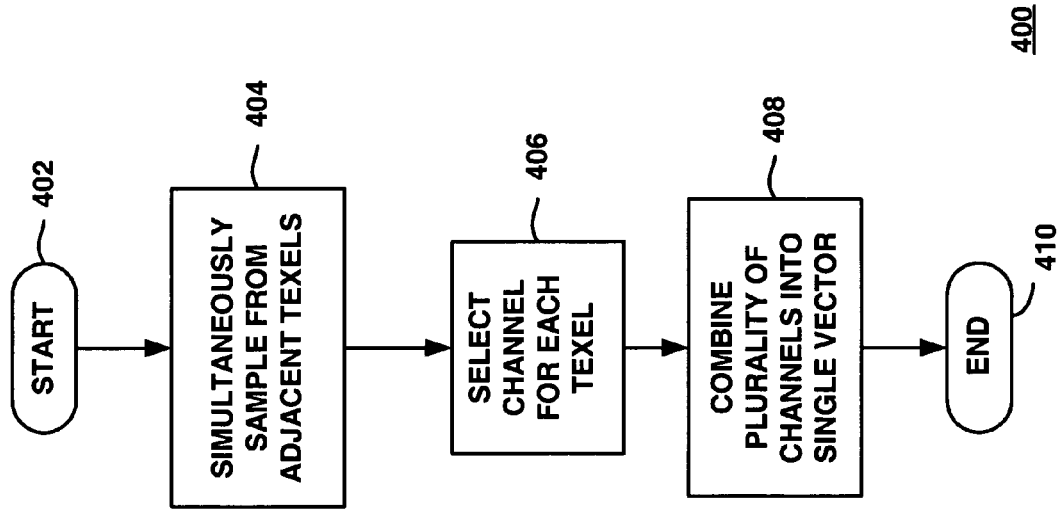
FIG. 4 illustrates a method in accordance with the present disclosure.

FIG. 4 illustrates an exemplary method performed by the apparatus illustrated in FIGS. 1-3. As illustrated, the flow diagram 400 begins at a start 402. Flow proceeds to block 404 where samples from adjacent texels are simultaneously sampled by the selection logic, as an example. After the channel data is sampled, flow proceeds to block 406 where a channel is selected for each of the texels sampled, such as the red channel R. Next flow proceeds to block 408 where the plurality of channels is combined into a single vector. This is performed, for example by the combination logic, discussed previously. Once the single color vector is achieved, the process ends at block 410. It is noted that this process 400 may be repeated for each of the different ones of the R, G, B, and A channels for each of the texels. That is, each of the remaining channels of the texels is sampled (e.g., the G channels are next sampled for each texel and a vector is produced, assuming the first sampled channel was the R channel, then the B channel for each texel and so on).

As disclosed, the apparatus and methods discussed achieve optimization of the performance of a pixel pipeline or texture pipeline by fetching or sampling of channels of pixels such as but not limited to neighboring pixels (or texels) in a simultaneous operation and immediately combing the sampled channels into a vector that is subsequently output to a shader, for example. Thus, the presently disclosed apparatus and methods avoid having to sample each of the four channels of a pixel or texel one at a time before outputting a vector, thereby reducing the time required for performing filtering, such as percentage closer filtering, for example.

The above detailed description of the present examples has been presented for the purposes of illustration and description only and not by limitation. It is therefore contemplated that the present application cover any additional modifications, variations, or equivalents but fall within the spirit and scope of the basic underlying principles disclosed above and the appended claims.

What is claimed is:

1. A logic circuit comprising:
    selector logic configured to retrieve data from a plurality of pixels, each pixel of said plurality of pixels having a plurality of pixel channels, and operable to select pixel channel data for a same pixel channel from said each pixel of said plurality of pixels; and
    combination logic configured to combine the pixel channel data into a single vector, wherein the single vector has a plurality of vector channels, and wherein the combination logic combines the pixel channel data into the single vector such that each vector channel of the single vector corresponds to the pixel channel data from said same pixel channel of a different pixel of the plurality of pixels.

2. The logic circuit as defined in claim 1, wherein the combination logic includes a filter.

3. The logic circuit as defined in claim 1, wherein the combination logic includes a multiplexer configured to combine the pixel channel data into the single vector.

4. A logic circuit comprising:
    selector logic configured to retrieve data from a plurality of texels, each texel of said plurality of texels having a plurality of texel channels, and operable to select texel channel data for a same texel channel from said each texel of said plurality of texels; and
    combination logic configured to combine the texel channel data into a single vector, wherein the single vector has a plurality of vector channels, and wherein the combination logic combines the texel channel data into the single vector such that each vector channel of the single vector is based at least on a portion of the texel channel data.

5. The logic circuit as defined in claim 4, wherein the combination logic includes a bilinear filter.

6. The logic circuit as defined in claim 4, wherein the combination logic includes a multiplexer configured to combine the texel channel data into the single vector.

7. The logic circuit as defined in claim 4, wherein the plurality of texels includes four neighboring texels.

8. A texture pipeline comprising:
    selector logic configured to retrieve data from a plurality of adjacent texels, each texel of said plurality of adjacent texels having a plurality of texel channels, and operable to select texel channel data for a same texel channel from said each texel of said plurality of adjacent texels; and combination logic configured to combine the texel channel data into a single vector, wherein the single vector has a plurality of vector channels, and wherein the combination logic combines the texel channel data into the single vector such that each vector channel of the single vector corresponds to the texel channel data from a different texel of the plurality of texels.

9. The texture pipeline as defined in claim 8, wherein the combination logic includes a bilinear filter.

10. The texture pipeline as defined in claim 8, wherein the combination logic includes a multiplexer configured to combine the texel channel data into the single vector.

11. The logic circuit as defined in claim 8, wherein the plurality of adjacent texels includes four neighboring texels.

12. An image processing circuit comprising:
a texture pipeline including:
selector logic configured to retrieve data from memory, the data being from a plurality of adjacent texels, each texel of said plurality of adjacent texels having a plurality of texel channels, and the selector logic operable to select texel channel data for a same texel channel from said each texel of the plurality of adjacent texels; and
combination logic configured to combine the texel channel data into a single vector, wherein the single vector has a plurality of vector channels, and wherein the combination logic combines the texel channel data into the single vector such that each vector channel of the single vector corresponds to the texel channel data from a different texel of the plurality of texels.

13. The image processing circuit as defined in claim 12, wherein the combination logic includes a bilinear filter.

14. The image processing circuit as defined in claim 12, wherein the combination logic includes a multiplexer configured to combine the texel channel data into the single vector.

15. The image processing circuit as defined in claim 12, wherein the plurality of adjacent texels includes four neighboring texels.

16. A method for combining texel information comprising:
simultaneously sampling, by a graphics processing unit, data from each of two or more adjacent texels, wherein each adjacent texel has a plurality of texel channels;
selecting texel channel data for a same texel channel from each of the two or more adjacent texels; and
combining the texel channel data into a single vector, wherein the single vector has a plurality of vector channels, such that each vector channel of the single vector corresponds to the texel channel data from a different texel of the two or more adjacent texels.

17. The method as defined in claim 16, wherein combining the selected data into the single vector is performed with a bilinear filter.

18. The method as defined in claim 16, wherein combining the texel channel data into the single vector includes multiplexing the texel channel data into the single vector.

19. The method as defined in claim 16, wherein the two or more adjacent texels includes four neighboring texels.

20. A method for combining pixel information comprising:
simultaneously sampling, by a graphics processing unit, data from each of two or more pixels, wherein each pixel has a plurality of pixel channels;
selecting pixel channel data for a same channel from each of the two or more pixels; and
combining the pixel channel data into a single vector, wherein the single vector has a plurality of vector channels, such that each vector channel of the single vector corresponds to the texel channel data from a different pixel of the two or more pixels.

21. The method as defined in claim 20, wherein combining the pixel channel data into the single vector is performed with a bilinear filter.

22. A method for combining texel information comprising:
sampling data, by a graphics processing unit, from each of two or more adjacent texels, wherein each adjacent texel has a plurality of texel channels;
selecting texel channel data for a same texel channel from each of the two or more adjacent texels; and
combining the texel channel data from each of the two or more adjacent texels into a single vector, wherein the single vector has a plurality of vector channels, such that each vector channel of the single vector corresponds to the texel channel data from a different texel of the two or more adjacent texels.

23. The logic circuit as defined in claim 2, wherein the filter is operable to blend pixel channel data from at least two pixels of the plurality of pixels such that at least one vector channel of the single vector represents the blended pixel channel data.

24. The logic circuit as defined in claim 5, wherein the bilinear filter is operable to blend texel channel data from at least two texels of the plurality of texels such that at least one vector channel of the single vector represents the blended texel channel data.

* * * * *